CONTROL SYSTEM FOR PRODUCTION OF SULFUR FROM HYDROGEN SULFIDE
Filed April 16, 1962
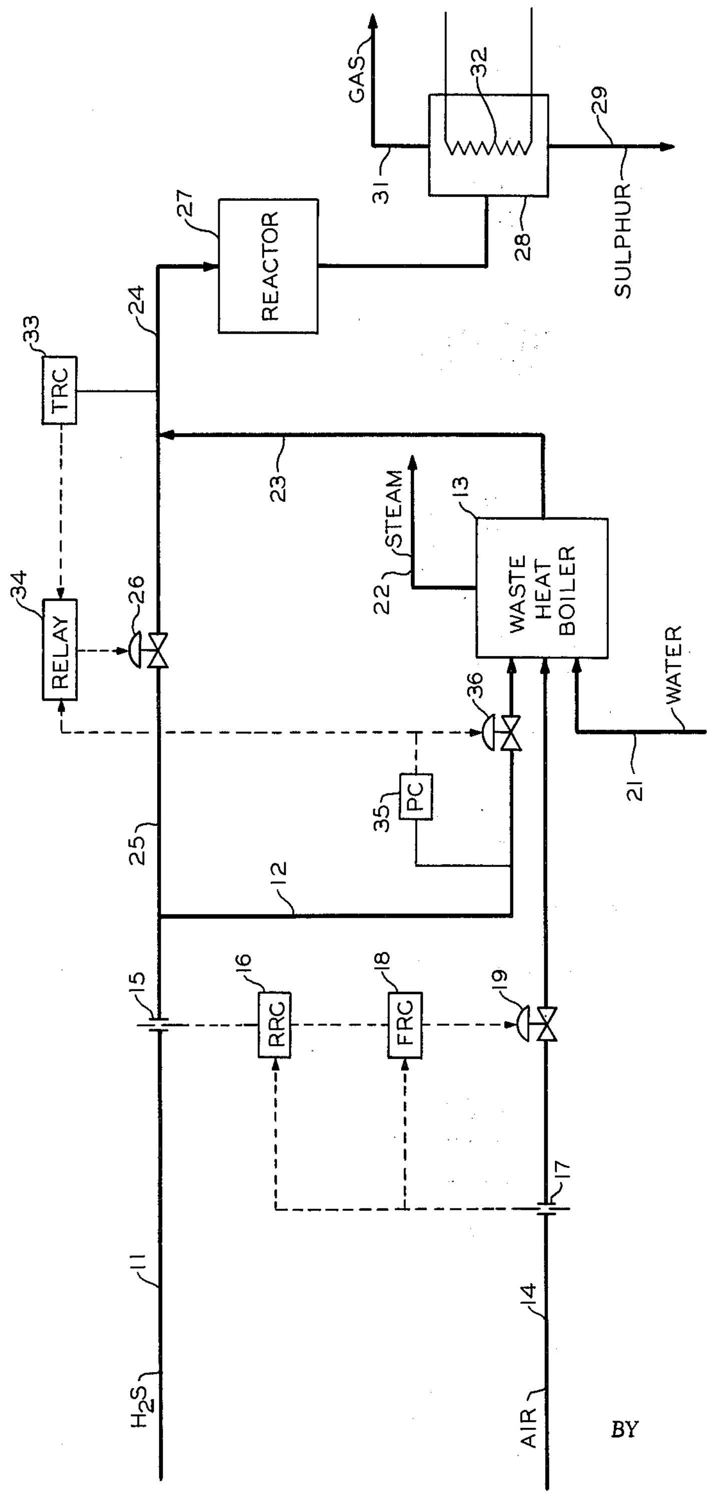
INVENTOR.
M. J. HENSLEY
BY
Young & Quigg
ATTORNEYS United States Patent Office 3,219,415

Patented Nov. 23, 1965

3,219,415

CONTROL SYSTEM FOR PRODUCTION OF SULFUR FROM HYDROGEN SULFIDE

Max J. Hensley, Odessa, Tex., assignor to Phillips Petroleum Company, a corporation of Delaware Filed Apr. 16, 1962, Ser. No. 187,629

9 Claims. (Cl. 23—225)

This invention relates to method and appartus for the production of sulfur. In one aspect the invention relates to the production of sulfur from hydrogen sulfide by the reaction therewith of oxygen to form free sulfur. In yet another aspect the invention relates to improved method and apparatus for controlling the ratio of oxygen to hydrogen sulfide fed to such a reaction. In a still further aspect the invention relates to bypassing a portion of the hydrogen sulfide around the reaction of the hydrogen sulfide and oxygen and mixing the bypassed hydrogen sulfide with the reaction products. In yet another aspect the invention relates to method and apparatus for controlling the temperature of the mixture of the bypassed hydrogen sulfide and the reaction products by manipulating the amount of hydrogen sulfide which is bypassed around the reactor. In still another aspect the invention relates to maintaining the pressure of the hydrogen sulfide fed to the reaction with oxygen at a substantially constant pressure.

It is common practice to produce free sulfur from hydrogen sulfide by burning a portion of the hydrogen sulfide to form $SO_2$ in accordance with the equation $2H_2S+3O_2=2H_2O+2SO_2$, and then reacting the $SO_2$ with hydrogen sulfide in accordance with the equation

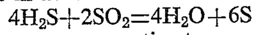

$$4H_2S+2SO_2=4H_2O+6S$$

It has also been common practice to pass one-third of the hydrogen sulfide through a steam generator wherein the hydrogen sulfide is burned to form sulfur dioxide, and then to catalytically react the sulfur dioxide with additional hydrogen sulfide to form free sulfur. It has been known to attempt to maintain the temperature of the mixture of sulfur dioxide and hydrogen sulfide fed to the catalytic reactor at a substantially constant temperature by manipulating the supply of air to burn the hydrogen sulfide to sulfur dioxide. However, in such a control system, manipulating the air supply resulted in varying the ratio of hydrogen sulfide to sulfur dioxide in the catalytic reaction feed from the desired value of 2 to 1, thus reducing the efficiency of the process.

In accordance with the present invention, it has been discovered that the temperature of the catalytic reaction feed can be maintained at a substantillly constant value while maintaining the ratio of hydrogen sulfide to sulfur dioxide in the catalytic reaction feed substantially at 2 to 1. This can be accomplished by manipulating the rate of flow of the hydrogen sulfide stream that bypasses the reaction of oxygen and hydrogen sulfide responsive to the temperature of the catalytic reaction feed. Still further in accordance with the invention means are provided to maintain the pressure of the hydrogen sulfide feed stream substantially constant. Still further in accordance with the invention means are provided for reducing or overriding the temperature control if the flow of hydrogen sulfide drops below a predetermined value.

Accordingly it is an object of the invention to provide improved method and apparatus for the production of sulfur. Another object of the invention is to provide an improved control system for regulating the reaction of hydrogen sulfide and oxygen to form sulfur dioxide and the reaction of the sulfur dioxide with additional hydrogen sulfide to form free sulfur. Another object of the invention is to maintain the temperature of the mixture of hydrogen sulfide and sulfur dioxide at a substantially constant value. Yet another object of the invention is to maintain the ratio of hydrogen sulfide to sulfur dioxide in the mixture of hydrogen sulfide and the reaction products of hydrogen sulfide and oxygen substantially constant. A still further object of the invention is to provide a more efficient system for producing sulfur from hydrogen sulfide.

Other aspects, objects and advantages of the invention will be apparent from a study of the disclosure, the drawing, and the appended claims to the invention.

Referring to the drawing, there is shown a schematic representation of a system for producing sulfur from hydrogen sulfide in accordance with the invention. Hydrogen sulfide is passed from any suitable source thereof through line 11 and line 12 into waste heat boiler 13. A suitable oxygen containing gas, such as air, is passed from any suitable source thereof through line 14 and into boiler 13. A first signal representative of the pressure drop across an orifice 15 in line 11 is transmitted to a first input of ratio recorder controller 16, while a second signal representative of the pressure drop across an orifice 17 in line 14 is transmitted to a second input of ratio recorder controller 16 and to the input of flow recorder controller 18. Ratio recorder controller 16 determines the ratio of the first signal to the second signal and compares this ratio to a set point representative of the desired ratio. The output of ratio recorder controller 16 is representative of any deviation of the actual ratio from the desired ratio and is transmitted to flow recorder controller 18 to adjust the set point thereof. Valve 19 in line 14 is adjusted responsive to the output of flow recorder controller 18, thereby maintaining the ratio of oxygen in line 14 to $H_2S$ in line 11 substantially constant. This ratio can be selected to provide the amount of oxygen required to react with one third of the hydrogen sulfide in line 11 to form sulfur dioxide. Where the gas in line 11 is from a process, it can contain inert gases and/or combustible gases other than hydrogen sulfide. In cases where such combustible gases are present, the ratio of air in line 14 to gas in line 11 can be selected to provide sufficient oxygen for the combustion of the combustible gases passing into boiler 13 as well as for the one-third of the hydrogen sulfide to be converted to sulfur dioxide.

Water can be introduced into waste heat boiler through line 21 and steam withdrawn through line 22. The combustion products from waste heat boiler 13, which can comprise sulfur dioxide, hydrogen sulfide, water vapor, carbon dioxide and nitrogen, are passed through line 23 into line 24. A portion of the hydrogen sulfide containing gas in line 11 can be passed through line 25, which contains valve 26, and into line 24, thus bypassing boiler 13. The bypassed gas and the combustion products from boiler 13 are intimately mixed in line 24 and then introduced into reactor 27, wherein the sulfur dioxide and the hydrogen sulfide react to form free sulfur. The reaction products are withdrawn from reactor 27 and passed to condenser 28 wherein the sulfur is condensed and removed through line 29 while the remaining gases are removed through line 31. A suitable cooling fluid, such as water, can be passed through coil 32 as a means of cooling condenser 28. If desired any unreacted hydrogen sulfide and sulfur dioxide in line 31 can be passed through one or more additional reactors to recover the additional sulfur.

There is an optimum temperature of about 475° F. in line 24 that will give the greatest increase in temperature of the gases passing through reactor 27. The greater this increase in temperature, the greater the amount of sulfur formed. If the temperature in line 24 is either too high or too low, the amount of sulfur formed in reactor 27 will decrease. The optimum temperature for the gases in line 24 varies depending upon the activity of the catalyst in reactor 27 and other factors. The optimum temperature for the gases in line 24 can be determined by varying the temperature in line 24 until the maximum temperature increase in reactor 27 is obtained.

In accordance with the invention the temperature of the combined gas in line 24 is maintained substantially constant by regulating the rate of flow of the hydrogen sulfide containing gas in line 25. Temperature recorder controller 33 senses the temperature of the gases in line 24 and transmits a signal representative thereof to relay 34. The output of relay 34 is utilized to manipulate normally closed valve 26 in line 25, thereby varying the amount of the hydrogen sulfide containing gas which bypasses boiler 13 and thus controlling the temperature of the mixture of gases in line 24.

In order to maintain the flow of at least one-third of the hydrogen sulfide into boiler 13, the pressure controller 35 produces a signal representative of the pressure in line 12 upstream of normally closed valve 36, and transmits the signal to valve 36 to maintain the pressure in line 11 substantially constant. The signal is also transmitted to the air supply input of relay 34 which can be any suitable device having an appropriate ratio, such as 2:1. A suitable relay is a delayed action fixed 2:1 ratio relay such as that described in Cat. No. 72–04–2 of Climax Control Division of Black, Sivals & Bryson.

If valves 26 and 36 are the same size, the ratio of relay 34 is preferably 2:1; while if valves 26 and 36 are of different sizes the ratio of relay 34 is preferably selected so that the maximum flow through valve 26 for a given value of the output of pressure controller 35 is twice the flow through valve 36 for the same value of the output of controller 35. For purposes of simplicity, the system will be described in terms of relay 34 having a ratio of 2:1. The output of relay 34 to valve 26 is thus directly proportional to the output of temperature recorder controller 33 unless the output of temperature recorder controller 33 is greater than twice the output of pressure controller 35. In systems where the flow of hydrogen sulfide containing gas in line 11 varies over a wide range, and particularly where the flow can drop to levels on the order of the minimum desirable throughput for boiler 13, relay 34 can be biased so that the output thereof to valve 26 is completely blocked unless the output of pressure controller 35 is at or above a predetermined value. In such systems the output of relay 34 is proportional to the output of temperature recorder controller 33 up to a maximum value which can be represented as 2(A—B) where A is the value of the output of pressure controller 35 and B is the bias on relay 34. Thus the temperature of the gases in line 24 is maintained substantially constant while the ratio of hydrogen sulfide to sulfur dioxide is maintained substantially equal to the desired value of 2:1.

The following example is presented as a further illustration of the invention, but is not to be construed in limitation thereof.

*Example*

A gas having a composition of approximately 82% $H_2S$, 17% $CO_2$ and 1% hydrocarbons, a temperature of 125° F., and a pressure of 8 p.s.i.g. was passed through line 11 at a rate of 550,000 s.c.f.d., with a first portion thereof being passed through line 12 to boiler 13 at a rate of 190,000 s.c.f.d. while a second portion thereof was bypassed through line 25 at a rate of 360,000 s.c.f.d. Air was passed through line 14 to boiler 13 at a rate of 1,200,000 s.c.f.d. Water was passed into a heating zone of boiler 13 to produce steam at150 p.s.i.g. The combustion products comprising sulfur dioxide, carbon dioxide, hydrogen sulfide, and water were removed through line 23 at a temperature of approximately 550° F. and passed into line 24 wherein the combustion products were admixed with the bypassed gases in line 25. Valves 26 and 36 were of equal size and ratio relay 34 had a ratio of 2:1 with a bias of 4 p.s.i. The temperature of the gases in line 24 was maintained at 475±5° F. The temperature rise across reactor 27 was approximately 150° F., and 85 weight percent of the sulfur was recovered from the reactor products and withdrawn through line 29. Water was passed through coil 32 to produce 45 p.s.i.g. steam.

As noted above, the drawing is merely diagrammatic and is not intended to fully show all component parts of the equipment which one skilled in the art will routinely design for the operation. Indeed, the showing of an element or piece of equipment does not mean that all such or similar pieces of equipment which may or can be designed by one skilled in the art in possession of this disclosure cannot be utilized as substitution therefor; likewise, the omission of an element which one skilled in the art may include in an actual unit does not mean that such a piece of equipment is intended to be omitted simply because it does not appear in the drawing. Suffice to say, the drawing is for illustrative purposes, as is the description thereof.

Reasonable variation and modification are possible within the scope of the foregoing disclosure, the drawing and the appended claims to the invention.

I claim:

1. A method for the production of sulfur comprising dividing a first stream of hydrogen sulfide containing gases into a first portion and a second portion, passing said first portion to a combustion zone, introducing an oxygen containing gas into said combustion zone at a rate sufficient to convert one-third of the hydrogen sulfide in said first stream to sulfur dioxide, bypassing said second portion around said combustion zone, withdrawing combustion products from said combustion zone, mixing the thus bypassed second portion and said combustion products, determining the temperature of the resulting mixture and controlling the rate of flow of said second portion responsive to the determination of said temperature, overriding the step of controlling when said second portion becomes greater than a predetermined percentage of said first portion to maintain said second portion below said predetermined percentage of said first portion, passing said resulting mixture to a reaction zone and therein reacting hydrogen sulfide and sulfur dioxide contained in said mixture to produce sulfur, and recovering sulfur as a product of said reaction zone.

2. Apparatus for the production of sulfur comprising means for dividing a first stream of hydrogen sulfide containing gases into a first portion and a second portion, a combustion chamber, means operatively connected between means for dividing and said combustion chamber for passing said first portion to said combustion chamber, means operatively connected to said combustion chamber for introducing an oxygen containing gas into said combustion chamber at a rate sufficient to convert one-third of the hydrogen sulfide in said first stream of sulfur dixoide, means operatively connected to said means for dividing for bypassing said second portion around said combustion chamber, means operatively connected to said combustion chamber for withdrawing combustion products from said combustion chamber, means operatively connected to said means for by-passing and to said means for withdrawing for mixing the thus bypassed second portion and said combustion products, means operatively connected to said means for mixing and to said means for by-passing for determining the temperature of the resulting mixture and controlling the rate of flow of said second portion responsive to the determination of said temperature, means operatively connected to said means for passing said first portion, to said means for passing said second portion and to said means for controlling for overriding said means for controlling when said second portion becomes greater than a predetermined percentage of said first portion, a reactor, means operatively connected between said means for mixing and said reactor for passing said resulting mixture into said reactor and therein reacting the hydrogen sulfide and sulfur dioxide contained in said mixture to produce sulfur, and means for recovering sulfur as a product of said reactor.

3. Apparatus for the production of sulfur comprising, a combustion chamber, first conduit means, means operatively connected to said first conduit means for passing hydrogen sulfide containing gases through said first conduit means, second conduit means communicating between said first conduit means and said combustion chamber for passing a first portion of said hydrogen sulfide containing gases from said first conduit means through said second conduit means into said combustion chamber, third conduit means having an outlet in communication with said combustion chamber, means operatively connected to said third conduit means for passing an oxygen containing gas through said third conduit into said combustion chamber, means operatively connected to said first and third conduit means for determining the ratio of the rates of flow of gases in said first and third conduit means and for manipulating the rate of flow of gases in said third conduit means responsive to the thus determined ratio to maintain said ratio substantially constant, mixing means, a fourth conduit means communicating between said combustion chamber and said mixing means for passing combustion gases from said combustion chamber into said mixing means, fifth conduit means communicating between said first conduit means and said mixing means for bypassing a second portion of said hydrogen sulfide containing gases from said first conduit means around said combustion chamber, valve means operatively disposed in said fifth conduit means, temperature determining means operatively connected to said mixing means for determining the temperature of the gases in said mixing means and establishing a first signal representative thereof, pressure determining means operatively connected to said first conduit means for determining the pressure of the gases in said first conduit means and establishing a second signal representative thereof, means operatively connected to said temperature determining means and to said pressure determining means for manipulating said valve means responsive to said first and second signals to maintain said first portion at a value equal to at least one-half of the value of said second portion and to maintain the thus determined temperature of the gases in said mixing means substantially constant at a predetermined desired value, a reactor for the reaction of hydrogen sulfide and sulfur dixoide to form sulfur and having its inlet connected to the outlet of said mixing means, and means for recovering the free sulfur contained in the output of said reactor.

4. Apparatus for the production of sulfur comprising, a combustion chamber, first conduit means, means operatively connected to said first conduit means for passing hydrogen sulfide containing gases through said first conduit means, second conduit means communicating between said first conduit means and said combustion chamber for passing a first portion of said hydrogen sulfide containing gases from said first conduit means through said second conduit means into said combustion chamber, means operatively connected to said first conduit means to maintain the pressure in said first conduit means substantially constant, third conduit means having an outlet in communication with said combustion chamber, means operatively connected to said third conduit means for passing an oxygen containing gas through said third conduit means into said combustion chamber, means operatively connected to said first and third conduit means for determining the ratio of the rates of flow of gases in said first and third conduit means and for manipulating the rate of flow of gases in said third conduit means responsive to the thus determined ratio to maintain said ratio substantially constant, mixing means, a fourth conduit means communicating between said combustion chamber and a first inlet of said mixing means for passing combustion gases from said combustion chamber into said mixing means, fifth conduit means communicating between said first conduit means and a second inlet of said mixing means for bypassing a second portion constituting the remainder of said hydrogen sulfide containing gases from said first conduit means around said combustion chamber, valve means operatively disposed in said fifth conduit means, temperature determining means operatively connected to said mixing means for determining the temperature of the gases in said mixing means and establishing a first signal representative thereof, pressure determining means operatively connected to said first conduit means for determining the pressure of the gases in said first conduit means and establishing a second signal representative thereof, means operatively connected to said temperature determining means, to said pressure determining means and to said valve means for manipulating said valve means proportional to the lower of said first signal and a value representative of twice said second signal to maintain said first portion at a value equal to at least one-half of the value of said second portion and to maintain the thus determined temperature of the gases in said mixing means substantially constant at a predetermined desired value, a reactor containing a catalyst suitable for aiding the reaction of hydrogen sulfide and sulfur dioxide to form sulfur and having its inlet connected to the outlet of said mixing means, and means for recovering the free sulfur contained in the output of said reactor.

5. Apparatus for the production of sulfur comprising, a combustion chamber, a first conduit means, means operatively connected to said first conduit means for passing hydrogen sulfide containing gases through said first conduit means, second conduit means communicating between said first conduit means and said combustion chamber for passing a first portion of said hydrogen sulfide containing gases from said first conduit means through said second conduit means into said combustion chamber, third conduit means having an outlet in communication with said combustion chamber, means operatively connected to said third conduit means for passing an oxygen containing gas through said third conduit means into said combustion chamber, means operatively connected to said first conduit means and to said third conduit means for determining the ratio of the rates of flow of gases in said first and third conduit means and for manipulating the rate of flow of gases in said third conduit means responsive to said ratio to maintain said ratio substantially constant, mixing means, a fourth conduit means communicating between said combustion chamber and said mixing means for passing combustion gases from said combustion chamber to said mixing means, fifth conduit means communicating between said first conduit means and said mixing means for bypassing a second portion of said hydrogen sulfide containing gases from said first conduit means around said combustion chamber, valve means operatively disposed in said fifth conduit means, temperature determining means operatively connected to said mixing means for determining the temperature of the gases in said mixing means, means operatively connected between said temperature determining means and said valve means for manipulating said valve means responsive to the thus determined temperature to maintain said temperature substantially equal to a predetermined desired value, means operatively connected to said mixing means for reacting the sulfur dioxide and hydrogen sulfide contained in the mixture of gases in said mixing means, and means for recovering the free sulfur contained in the output of said means for reacting.

6. Apparatus for the production of sulfur comprising, a combustion chamber, first conduit means, means operatively connected to said first conduit means for passing hydrogen sulfide containing gases through said first conduit means, second conduit means communicating between said first conduit means and said combustion chamber for passing a first portion of said hydrogen sulfide containing gases from said first conduit means through said second conduit means into said combustion chamber, first valve means operatively disposed in said second conduit means, means operatively connected to said first valve means and to said second conduit upstream of said first valve means and responsive to the pressure of said gases in said second conduit means upstream of said first valve means for manipulating said first valve means to maintain said pressure substantially constant, third conduit means having an outlet in communication with said combustion chamber, means operatively connected to said third conduit means for passing an oxygen containing gas through said third conduit means into said combustion chamber, second valve means operatively disposed in said third conduit means, first flow rate determining means operatively connected to said first conduit means for determining the rate of flow of gases in said first conduit means and establishing a first signal representative thereof, second flow rate, determining means operatively connected to said third conduit means for determining the rate of flow of gases in said third conduit means and establishing a second signal representative thereof, means operatively connected to said first and second flow rate determining means and to said second valve means for determining responsive to said first and second signals the ratio of the rates of flow of gases in said first and third conduit means and for manipulating said second valve means responsive to the thus determined ratio to maintain said ratio substantially constant, fourth conduit means, a fifth conduit means operatively connected between said combustion chamber and said fourth conduit means for passing combustion gases from said combustion chamber to said fourth conduit means, sixth conduit means communicating between said first conduit means and said fourth conduit means for bypassing a second portion of said hydrogen sulfide containing gases from said first conduit means around said combustion chamber, third valve means operatively disposed in said sixth conduit means, a ratio relay means, means operatively connected to said fourth conduit means and to the first input of said ratio relay means for determining the temperature of the gases in said fourth conduit means and transmitting a signal representative thereof to the first input of said ratio relay means, means operatively connected to said first conduit means and to the air supply inlet of said ratio relay means for transmitting a signal representative of the pressure of the gases in said first conduit means to the air supply inlet of said ratio relay means, means operatively connected between said third valve means and the output of said ratio relay means for manipulating said third valve means responsive to the output of said ratio relay means, a reactor containing a catalyst suitable for aiding the reaction of hydrogen sulfide and sulfur dioxide to form sulfur and having its inlet connected to the downstream end of said fourth conduit means, and means for recovering the free sulfur contained in the output of said reactor.

7. Apparatus in accordance with claim 6 wherein said first and third valve means are the same size and said ratio relay means has a ratio of 2:1.

8. Apparatus in accordance with claim 6 further comprising means operatively connected to said combustion chamber for passing a stream of water into heat exchanging relationship with said combustion chamber to produce steam.

9. Apparatus for the production of sulfur comprising, a combustion chamber, first conduit means, means operatively connected to said first conduit means for passing hydrogen sulfide containing gases through said first conduit means, second conduit means communicating between said first conduit means and said combustion chamber for passing a first portion of said hydrogen sulfide containing gases from said first conduit means through said second conduit means into said combustion chamber, first valve means operatively disposed in said second conduit means, means operatively connected to said first valve means and to said second conduit means upstream of said first valve means for determining the pressure of said gases in said second conduit means upstream of said first valve means and for manipulating said first valve means responsive to the thus determined pressure to maintain said pressure substantially constant, third conduit means communicating with said combustion chamber, means operatively connected to said third conduit means for introducing an oxygen containing gas through said third conduit means into said combustion chamber, second valve means operatively disposed in said third conduit means, a first orifice operatively positioned in said first conduit means, a ratio controller having first and second inputs and an output, means connected across said first orifice for applying to said first inlet a signal responsive to the pressure drop across said first orifice, a second orifice operatively positioned in said third conduit, means connected across said second orifice for applying to said second inlet a signal responsive to the pressure drop across said second orifice, means operatively connected between said second valve means and the output of said ratio controller for manipulating said second valve means responsive to the output of said ratio controller to maintain the ratio of the rates of flow of gases in said first and third conduit means substantially constant, fourth conduit means, a fifth conduit means operatively connected between said combustion chamber and said fourth conduit means for passing combustion gases from said combustion chamber to said fourth conduit means, sixth conduit means communicating between said first conduit means and said fourth conduit means for bypassing a second portion constituting the remainder of said hydrogen sulfide containing gases from said first conduit means around said combustion chamber, third valve means operatively disposed in said sixth conduit means, a ratio relay means having a first input, an air supply inlet an dan outpput, means operatively connected to said fourth conduit means to the first input of said ratio relay means for determining the temperature of the gases in said fourth conduit means and transmitting a signal representative thereof to said first input of said ratio relay means, means operatively connected to said first conduit means and to the air supply inlet of said ratio relay means for transmitting a signal representative of the pressure of the gases in said first conduit means to said air supply inlet of said ratio relay means, means operatively connected between said third valve means and the output of said ratio relay means for maniplating said third valve means responsive to the output of said ratio relay means, a reactor containing a catalyst suitable for aiding the reaction of hydrogen sulfide and sulfur dioxide to form sulfur and having its inlet connected to the downstream end of said fourth conduit means, and means for recovering the free sulfur contained in the output of said reactor.

References Cited by the Examiner

UNITED STATES PATENTS

| | | | |
|---|---|---|---|
| 1,672,778 | 6/1928 | Raffloer | 23—260 |
| 2,388,259 | 11/1945 | Fleming et al. | 23—226 |
| 2,413,714 | 1/1947 | Keeling | 23—225.1 |
| 2,635,039 | 4/1953 | Peters | 23—260 |
| 2,650,154 | 8/1953 | Anderson | 23—225.1 |
| 2,669,504 | 2/1954 | Halvorson et al. | 23—230 |

MORRIS O. WOLK, *Primary Examiner.*

MAURICE A. BRINDISI, JAMES H. TAYMAN, Jr., *Examiners.*